(12) United States Patent
Ao et al.

(10) Patent No.: US 10,645,060 B2
(45) Date of Patent: May 5, 2020

(54) METHOD, DEVICE AND SYSTEM FOR FORWARDING MESSAGE

(71) Applicant: ZTE Corporation, Shenzhen (CN)

(72) Inventors: Ting Ao, Shenzhen (CN); Bo Wu, Shenzhen (CN)

(73) Assignee: XI'AN Zhongxing New Software Co., LTD, Shaanxi (CN)

( * ) Notice: Subject to any disclaimer, the term of this patent is extended or adjusted under 35 U.S.C. 154(b) by 176 days.

(21) Appl. No.: 15/577,429

(22) PCT Filed: Jan. 4, 2016

(86) PCT No.: PCT/CN2016/070076
§ 371 (c)(1),
(2) Date: Nov. 28, 2017

(87) PCT Pub. No.: WO2016/188124
PCT Pub. Date: Dec. 1, 2016

(65) Prior Publication Data
US 2018/0152414 A1 May 31, 2018

(30) Foreign Application Priority Data
May 28, 2015 (CN) .......................... 2015 1 0283760

(51) Int. Cl.
H04L 12/66 (2006.01)
H04L 29/12 (2006.01)
(Continued)

(52) U.S. Cl.
CPC ...... H04L 61/2596 (2013.01); H04L 12/4633 (2013.01); H04L 12/66 (2013.01);
(Continued)

(58) Field of Classification Search
None
See application file for complete search history.

(56) References Cited

U.S. PATENT DOCUMENTS

2010/0165985 A1* 7/2010 Sharma ................... H04L 47/10
370/389
2015/0092564 A1 4/2015 Aldrin
(Continued)

FOREIGN PATENT DOCUMENTS

| CN | 104022949 A | 9/2014 |
| CN | 104639414 A | 5/2015 |
| WO | 2016089575 A1 | 6/2016 |

OTHER PUBLICATIONS

International Search Report for corresponding application PCT/CN2016/070076 filed Jan. 4, 2016; dated Mar. 25, 2016.
(Continued)

Primary Examiner — Kodzovi Acolatse
(74) Attorney, Agent, or Firm — Cantor Colburn LLP

(57) ABSTRACT

A method, device and system for message forwarding are provided. The method may include the following acts. A second device in a second domain receives a first message from a first domain. The second device allocates, for the first message, a second Service Function Path Identifier (SFPID) corresponding to a Service Function Chain (SFC) in the second domain, and obtains a second message. The second device sends the second message to one or more other devices, except the second device, in the second domain.

17 Claims, 4 Drawing Sheets

(51) Int. Cl.
*H04L 12/715* (2013.01)
*H04L 12/46* (2006.01)

(52) U.S. Cl.
CPC .............. *H04L 45/04* (2013.01); *H04L 45/64* (2013.01); *H04L 61/1541* (2013.01); *H04L 61/2076* (2013.01)

(56) References Cited

U.S. PATENT DOCUMENTS

| | | | | |
|---|---|---|---|---|
| 2015/0222640 | A1* | 8/2015 | Kumar | H04L 47/782 370/230 |
| 2016/0028640 | A1* | 1/2016 | Zhang | H04L 45/306 370/389 |
| 2016/0119253 | A1* | 4/2016 | Kang | H04L 67/2814 370/228 |
| 2016/0165014 | A1* | 6/2016 | Nainar | H04L 45/64 370/392 |
| 2016/0173373 | A1* | 6/2016 | Guichard | H04L 45/74 370/392 |
| 2016/0352629 | A1* | 12/2016 | Wang | H04L 45/306 |
| 2017/0155582 | A1* | 6/2017 | Xu | H04L 45/20 |
| 2017/0288909 | A1* | 10/2017 | Bottorff | H04L 12/6418 |
| 2018/0102919 | A1* | 4/2018 | Hao | H04L 12/4633 |
| 2019/0149360 | A1* | 5/2019 | Casado | H04L 12/66 |

OTHER PUBLICATIONS

D. Dolson et al., "Hierarchical Service Chaining draft-dolson-sfc-hierarchical-00", May 25, 2015, pp. 1-11. XP055471514. Retrieved from Internet: URL: https://tools.ietf.org/html/draft-dolson-sfc-hierarchical-00.

European Office Action for corresponding application EP 16 799 013.4; dated Oct. 10, 2019.

European Search Report for corresponding application 16 799 013.4; dated May 11, 2018.

* cited by examiner

| Ver | O | R | Length | MD type | Next protocol | |
|---|---|---|---|---|---|---|
| SFPID2 | | | | | Service function indicator | DC network SFC header |
| Metadata | | | | | | |
| Ver | O | R | Length | MD type | Next protocol | |
| SFPID1 | | | | | Service function indicator | WAN SFC header |
| Metadata | | | | | | |
| Load | | | | | | |

| Ver | O1 | O2 | R | Length | MD type | Next protocol |
|---|---|---|---|---|---|---|
| | | | | | | Service function indicator |
| Outer TLV | | | | | | |
| Other metadata | | | | | | |

| Ver | O | R | Length | MD type | Next protocol | DC2 network SFC header |
|---|---|---|---|---|---|---|
| SFPID2' | | | | | Service function indicator | |
| Metadata | | | | | | |
| Ver | O | R | Length | MD type | Next protocol | WAN SFC header |
| SFPID1 | | | | | Service function indicator | |
| Metadata | | | | | | |
| Load | | | | | | |

METHOD, DEVICE AND SYSTEM FOR FORWARDING MESSAGE

TECHNICAL FIELD

The present disclosure relates to the communication field, in particular to a method, device and system for message forwarding.

BACKGROUND

Data accessing a network may be input into a large amount of value-added service devices, such as an anti-virus device, an accelerating device, a firewall device and a Network Address Translation (NAT) device. Traffic has to pass through these service devices without distinction, so unnecessary burdens may be brought to these devices, and the optimization of service resources may be restricted. In addition, the configuration may be complex, which makes it very difficult to realize a quick change of service configurations.

Aiming at the above problems, a Service Function Chain (SFC) mode is proposed. In the SFC mode, all serving services are integrated, and a service overlay layer is virtualized, so as to form a service topology. The service overlay layer is decoupled from the underlying network, so as not to be limited by the structure of the underlying network. The framework is shown in FIG. 1. The service through which the traffic passes may be determined by the SFC. The SFC may allocate different SFCs (which is implemented by an entry classifying device) to traffics at different levels by adding a Service Function Path Identifier (SFPID) to each SFC and classifying messages. A forwarding device may forward the message according the identifier of the SFC. As such, different service chain processing may be implemented for different traffics, so as to implement differentiated demands.

At present, the processing of the SFC is shown in FIG. 1. Different Service Functions (SF) or Service Function Forwarders (SFF) may be selected, according to the SFPID carried in the message, to forward a message. That is, for a message received from a classifier or an SFF, the SFF may forward the message to an SF belonging to this service chain path according to the SFPID of the message. For a message received from an SF, the SFF may select a next hop according to the SFPID of the message, and then send the message to a next SFF according to an address of the next hop.

For a Wide Area Network (WAN), some service functions therein may lease the service functions of other networks to perform complex processing. For example, some service functions in a Data Center (DC) network may be leased to perform some special processing on the traffic. In such a case, the traffic needs to enter the DC network. However, the specific service functions and connection relations in the DC network may be shielded to the lessee, and the devices in the DC network cannot identify the SFCID of the WAN. In this scenario, SFC supporting for end-to-end traffic cannot be implemented.

Aiming at the problem that SFC supporting for cross-network end-to-end traffic cannot be implemented, an effective solution has not been proposed.

SUMMARY

The embodiments of the present disclosure provide a method, device and system for message forwarding, which may at least solve a problem that SFC supporting for end-to-end traffic cannot be implemented.

According to an embodiment of the present disclosure, a method for message forwarding is provided, which may include the following acts. A second device in a second domain may receive a first message from a first domain. The second device may allocate, for the first message, a second SFPID corresponding to an SFC in the second domain, and may obtain a second message. The second device may send the second message to one or more other devices, except the second device, in the second domain.

In an exemplary embodiment, the first message may carry a first SFPID allocated by the first domain for the first message.

In an exemplary embodiment, the second device in the second domain may receive the first message from the first domain in a following manner. The second device may receive the first message through a Gateway (GW) device of the second domain.

In an exemplary embodiment, the first message may be sent to the second domain by the first domain according to an address of the GW device of the second domain. The address of the GW device of the second domain may be obtained by the first domain through a coordination management entity. The address of the GW device of the second domain may serve as an address of an SF, corresponding to the SFC, of the first domain. In an exemplary embodiment, the second device may allocate, for the first message, the second SFPID corresponding to the SFC in the second domain, and obtain the second message in a following manner. The second device may classify the first message, and generate the second SFPID according to a classification result. The second device may encapsulate the first message by adding the second SFPID outside the first message, so as to obtain the second message.

In an exemplary embodiment, the second device may classify the first message in a following manner. A classifier of the second domain may classify the first message according to header information of the first message and/or the first SFPID.

In an exemplary embodiment, the second device may classify the first message according to header information of the first message and/or the first SFPID in a following manner. The first domain and the second domain may be coordinated by a coordination management entity. The classifier of the second domain may obtain a corresponding relation between the first SFPID and the second SFPID.

In an exemplary embodiment, after the second device sends the second message to one or more other devices, except the second device, in the second domain, the method may include the following acts. An SFF of a final hop of the second domain may de-encapsulate the second message to remove the second SFPID, so as to obtain the first message. The SFF may send the first message to one or more other domains, except the second domain, via a GW device of the second domain.

In an exemplary embodiment, the second device may allocate, for the first message, the second SFPID corresponding to the SFC in the second domain, and obtain the second message in a following manner. The second device may classify the first message, and obtain a classification result. The second device may generate the second SFPID according to the classification result. The second device may replace the first SFPID in a header of the first message with the second SFPID, so as to obtain the second message.

In an exemplary embodiment, the second device may classify the first message in a following manner. The classifier of the second domain may classify the first message according to header information of the first message and/or the first SFPID.

In an exemplary embodiment, after the second device sends the second message to one or more other devices, except the second device, in the second domain, the method may include the following acts. An SFF of a final hop of the second domain may replace the second SFPID with the first SFPID, so as to obtain the first message. The SFF may send the first message to one or more other domains, except the second domain, via a GW device of the second domain.

In an exemplary embodiment, the second device may allocate, for the first message, the second SFPID corresponding to the SFC in the second domain, and obtain the second message in a following manner. According to a corresponding relation between the first SFPID and the second SFPID, the second SFPID corresponding to the first SFPID may be allocated for the first message, and the first SFPID may be saved in metadata, so as to obtain the second message.

In an exemplary embodiment, after the second device sends the second message to one or more other devices, except the second device, in the second domain, the method may include the following acts. An SFF of a final hop of the second domain may obtain the first SFPID from the metadata, map the second SFPID to the first SFPID, and revert the second message encapsulated with the second SFPID to the first message.

In an exemplary embodiment, after the SFF sends the first message to one or more other domains, except the second domain, via the GW device of the second domain, the method may include the following acts. When the second domain no longer provides service function processing of the first message, the GW device in the second domain may send to the first domain a notification message for deleting an SF provided by the second domain.

In an exemplary embodiment, the second domain may include: a master domain and a backup domain.

In an exemplary embodiment, the second device may be a classifier in the second domain.

According to another embodiment of the present disclosure, a device for message forwarding is provided, which may be applied to the second device in the second domain. The device may include a receiving module, an allocating module and a sending module. The receiving module may be configured to receive the first message from the first domain. The allocating module may be configured to allocate, for the first message, the second SFPID corresponding to the SFC in the second domain, and obtain the second message. The sending module may be configured to send the second message to one or more other devices, except the second device, in the second domain.

In an exemplary embodiment, the first message may carry the first SFPID allocated by the first domain for the first message.

In an exemplary embodiment, the receiving module may be further configured to send the address of the GW device of the second domain to the first domain, and receive the first message through the GW device of the second domain.

In an exemplary embodiment, the allocating module may further include a first classifying unit, a first generating unit and an encapsulating unit. The first classifying unit may be configured to classify the first message, and obtain the classification result. The first generating unit may be configured to generate the second SFPID according to the classification result. The encapsulating unit may be config-ured to encapsulate the first message by adding the second SFPID outside the first message, so as to obtain the second message.

In an exemplary embodiment, the allocating module may further include a second classifying unit, a second generating unit and a replacing unit. The second classifying unit may be configured to classify the first message, and obtain the classification result. The second generating unit may be configured to generate the second SFPID according to the classification result. The replacing unit may be configured to replace the first SFPID in a header of the first message with the second SFPID, and save the first SFPID in metadata, so as to obtain the second message.

In an exemplary embodiment, the allocating module may further include an obtaining unit. The obtaining unit may be configured to obtain the corresponding relation between the first SFPID and the second SFPID, and allocate, for the first message, the second SFPID corresponding to the first SFPID, and obtain the second message.

In an exemplary embodiment, the second device may be a classifier in the second domain.

According to still another embodiment of the present disclosure, a system for message forwarding is provided. The system may include: a first device in a first domain, and a second device in a second domain. The second device may be configured to receive the first message sent by the first device, allocate, for the first message, the second SFPID corresponding to the SFC in the second domain, obtain the second message, and send the second message to one or more other devices, except the second device, in the second domain.

In an exemplary embodiment, the system may further include: a GW device and an SFF of a final hop in the second domain, and a third device in a domain other than the second domain. The SFF of the final hop may be configured to revert the second message to the first message, and send the first message to the GW device. The GW device may be configured to receive the first message from the first domain and send the first message to the second device, and send the first message reverted by the SFF of the final hop to the third device.

According to some embodiments of the present disclosure, the second device in the second domain may receive the first message from the first domain; the second device may allocate, for the first message, the second SFPID corresponding to the SFC in the second domain, and obtain the second message; and the second device may send the second message to one or more other devices, except the second device, in the second domain. By virtue of the solution, a problem that SFC supporting for end-to-end traffic cannot be implemented is solved, thereby enabling an SFC to pass through multiple domains, and guaranteeing the privacy of an internal service chain of a DC domain.

BRIEF DESCRIPTION OF THE DRAWINGS

The accompanying drawings described here are used for providing a deeper understanding of the present disclosure, and constitute a part of the application. Schematic embodi-ments of the present disclosure and description thereof are used for illustrating the present disclosure and not intended to form an improper limit to the present disclosure. In the accompanying drawings.

DETAILED DESCRIPTION OF THE EMBODIMENTS

The present disclosure is elaborated below with reference to the accompanying drawings and embodiments. Note that, the embodiments of the present disclosure and the characteristics in the embodiments may be combined under the condition of no conflicts.

Figure 2:
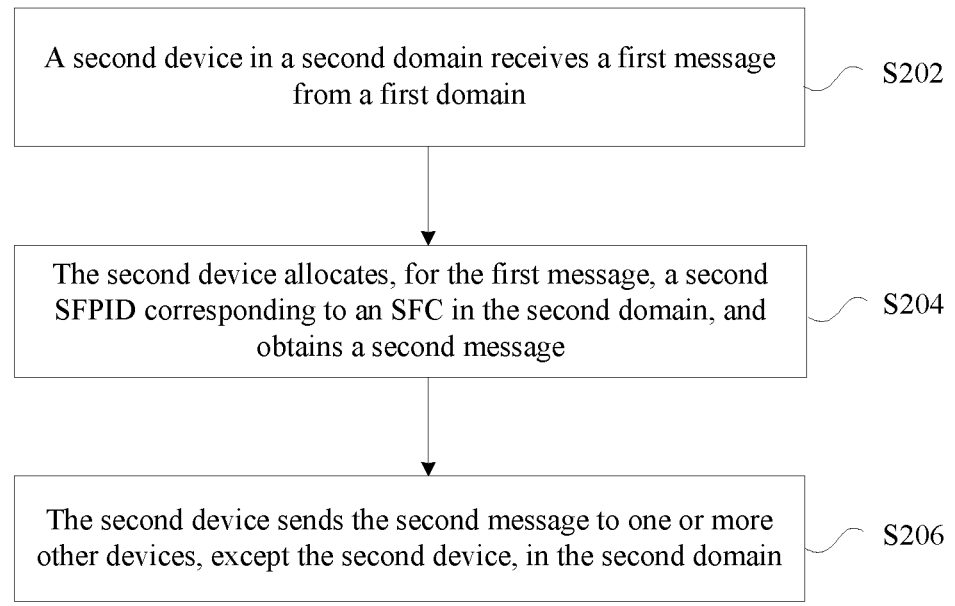
FIG. 2 is a flowchart of a method for message forwarding according to an embodiment of the present disclosure.

In the present embodiment, a method for message forwarding is provided. FIG. 2 is a flowchart of a method for message forwarding according to an embodiment of the present disclosure. As shown in FIG. 2, the flow may include the following acts.

At act S202, a second device in a second domain may receive a first message from a first domain.

At act S204, the second device may allocate, for the first message, a second SFPID corresponding to an SFC in the second domain, and obtain a second message.

At act S206, the second device may send the second message to one or more other devices, except the second device, in the second domain.

Through the above acts, various service processing may be effectively provided for the message passing through different domains. Compared with a problem that the specific service functions and connection relations thereof in the DC network are shielded to the lessee, the above acts solve a problem that SFC supporting for cross-network end-to-end traffic cannot be implemented. By virtue of the solution, an SFC may be enabled to pass through multiple domains, and the privacy of an internal service chain of the DC domain may be guaranteed.

In an exemplary embodiment, the first message may carry a first SFPID allocated by the first domain for the first message, so as to facilitate the transmission of the first message.

At act S202, the second device may receive the first message. In an exemplary embodiment, the second device may receive the first message through a GW device of the second domain.

In an exemplary embodiment, the first message may be sent to the second domain by the first domain according to an address of the GW device of the second domain. The address of the GW device of the second domain may be obtained by the first domain through a coordination management entity. The address of the GW device of the second domain may serve as an address of an SF, corresponding to the SFC, of the first domain.

At act S204, the second device may allocate, for the first message, the second SFPID corresponding to the SFC in the second domain, and obtain the second message. Note that, the second message may be obtained in a variety of ways, and an exemplary implementation is illustrated below. In an exemplary embodiment, the second device may classify the first message, and obtain a classification result. The second device may generate the second SFPID according to the classification result. The second device may encapsulate the first message by adding the second SFPID outside the first message, so as to obtain the second message.

When the second device classifies the first message, in an exemplary embodiment, a classifier of the second domain may classify the first message according to header information of the first message and/or the first SFPID. The header information of the first message may include: the first SFPID and/or other information, except the first SFPID, in the header information of the first message. In an exemplary embodiment, the first domain and the second domain may be coordinated by the coordination management entity, and the classifier of the second domain may obtain a corresponding relation between the first SFPID and the second SFPID, so that the classifier of the second domain may classify the first message according to header information of the first message and/or the first SFPID.

Because various service processing is to be provided to the traffic passing through different domains, in an exemplary embodiment, after the second device sends the second message to one or more other devices, except the second device, in the second domain, an SFF of a final hop of the second domain may de-encapsulate the second message to remove the second SFPID, so as to obtain the first message. The SFF may send the first message to one or more other domains, except the second domain, via a GW device of the second domain. An SFF of a final hop of the second domain may be the last SFF receiving the second message in the second domain.

At act S204, the second device may allocate, for the first message, the second SFPID corresponding to the SFC in the second domain, and obtain the second message. Note that, the second message may be obtained in a variety of ways, and an exemplary implementation is illustrated below. The second device may classify the first message, and obtain a classification result. The second device may generate the second SFPID according to the classification result. The second device may replace the first SFPID in a header of the first message with the second SFPID, so as to obtain the second message.

Because various service processing is to be provided to the traffic passing through different domains, in an exemplary embodiment, after the second device sends the second message to one or more other devices, except the second device, in the second domain, an SFF of a final hop of the second domain may replace the second SFPID with the first SFPID, so as to obtain the first message. The SFF may send the first message to one or more other domains, except the second domain, via a GW device of the second domain.

At act S204, the second device may allocate, for the first message, the second SFPID corresponding to the SFC in the second domain, and obtain the second message. Note that, the second message may be obtained in a variety of ways, and an exemplary implementation is illustrated below. According to a corresponding relation between the first SFPID and the second SFPID, the second SFPID corresponding to the first SFPID may be allocated for the first message, and the first SFPID may be saved in metadata, so as to obtain the second message.

Because various service processing is to be provided to the traffic passing through different domains, in an exemplary embodiment, after the second device sends the second message to one or more other devices, except the second device, in the second domain, an SFF of a final hop of the second domain may obtain the first SFPID from the metadata, map the second SFPID to the first SFPID, and revert the second message encapsulated with the second SFPID to the first message. The SFF may send the first message to one or more other domains, except the second domain, via a GW device of the second domain.

In an exemplary embodiment, after the SFF sends the first message to one or more other domains, except the second domain, via a GW device of the second domain, when the second domain no longer provides service function processing of the first message, the GW device in the second domain may send to the first domain a notification message for deleting an SF provided by the second domain, so that the traffic of the first domain may not be sent to the second domain any more.

In an exemplary embodiment, the second domain may include: a master domain and a backup domain. The backup domain may be enabled after the master domain has a failure.

In an exemplary embodiment, the second device may be a classifier in the second domain.

In the present embodiment, a device for message forwarding is provided, which may be configured to implement the above embodiment and exemplary implementation mode. The embodiments which have been elaborated may not be repeated herein. The term "module" used below can realize a combination of software and/or hardware with an intended function. Although the device described in the following embodiment is realized through software better, the realization through hardware or a combination of software and hardware is possible and conceived.

Figure 3:
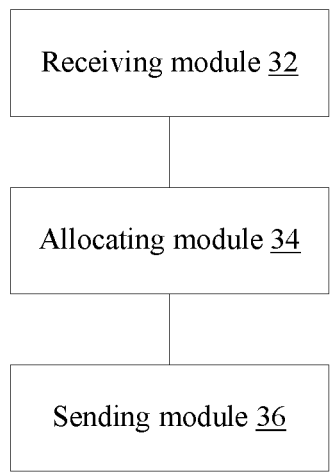
FIG. 3 is a structure diagram of a device for message forwarding according to an embodiment of the present disclosure.

FIG. 3 is a structure diagram of a device for message forwarding according to an embodiment of the present disclosure. The device may be applied to the second device in the second domain. As shown in FIG. 3, the device may include a receiving module 32, an allocating module 34 and a sending module 36. The receiving module 32 may be configured to receive the first message from the first domain. The allocating module 34 may be configured to allocate, for the first message, the second SFPID corresponding to the SFC in the second domain, and obtain the second message. The sending module 36 may be configured to send the second message to one or more other devices, except the second device, in the second domain.

In an exemplary embodiment, the first message may carry the first SFPID allocated by the first domain for the first message.

In an exemplary embodiment, the receiving module 32 may be further configured to send the address of the GW device of the second domain to the first domain, and receive the first message through the GW device of the second domain.

Figure 4:
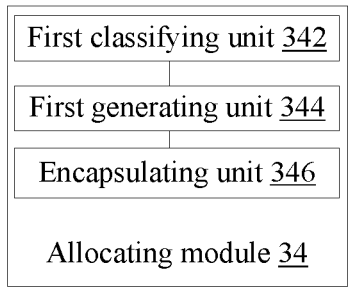
FIG. 4 is a first exemplary structure diagram of a device for message forwarding according to an embodiment of the present disclosure.

FIG. 4 is a first exemplary structure diagram of a device for message forwarding according to an embodiment of the present disclosure. As shown in FIG. 4, the allocating module 34 may further include a first classifying unit 342, a first generating unit 344 and an encapsulating unit 346. The first classifying unit 342 may be configured to classify the first message, and obtain the classification result. The first generating unit 344 may be configured to generate the second SFPID according to the classification result. The encapsulating unit 346 may be configured to encapsulate the first message by adding the second SFPID outside the first message, so as to obtain the second message.

Figure 5:
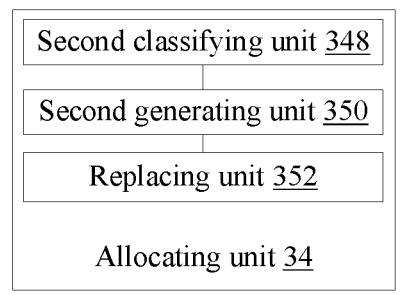
FIG. 5 is a second exemplary structure diagram of a device for message forwarding according to an embodiment of the present disclosure.

FIG. 5 is a second exemplary structure diagram of a device for message forwarding according to an embodiment of the present disclosure. As shown in FIG. 5, the allocating module 34 may further include a second classifying unit 348, a second generating unit 350 and a replacing unit 352. The second classifying unit 348 may be configured to classify the first message, and obtain the classification result. The second generating unit 350 may be configured to generate the second SFPID according to the classification result. The replacing unit 352 may be configured to replace the first SFPID in a header of the first message with the second SFPID, and save the first SFPID in metadata, so as to obtain the second message.

Figure 6:
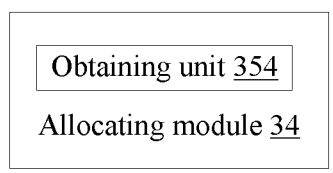
FIG. 6 is a third exemplary structure diagram of a device for message forwarding according to an embodiment of the present disclosure.

FIG. 6 is a third exemplary structure diagram of a device for message forwarding according to an embodiment of the present disclosure. As shown in FIG. 6, the allocating module 34 may further include an obtaining unit 354. The obtaining unit 354 may be configured to obtain the corresponding relation between the first SFPID and the second SFPID, allocate, for the first message, the second SFPID corresponding to the first SFPID, and obtain the second message.

In an exemplary embodiment, the second device may be a classifier in the second domain.

In another exemplary embodiment, a system for message forwarding is provided, which may include: a first device in a first domain, and a second device in a second domain. The second device may be configured to receive the first message sent by the first device, allocate, for the first message, the second SFPID corresponding to the SFC in the second domain, obtain the second message, and send the second message to one or more other devices, except the second device, in the second domain.

In an exemplary embodiment, the system may further include: a GW device and an SFF of a final hop in the second domain, and a third device in a domain other than the second domain. The SFF of the final hop may be configured to revert the second message to the first message, and send the first message to the GW device. The GW device may be configured to receive the first message from the first domain and send the first message to the second device, and send the first message reverted by the SFF of the final hop to the third device.

Note that, the modules may be implemented by software or hardware. For the latter, the modules may be implemented in, but not limited to, the following way: all the modules may be in the same processor; or, the modules may be respectively in a first processor, a second processor, a third processor, and so on.

Aiming at the problem, an elaboration is given below in combination with the specific exemplary embodiments. The above exemplary embodiments and exemplary implementation modes thereof are combined in the following exemplary embodiments.

In the exemplary embodiment, a hierarchical SFC is provided, so that various service processing may be effectively provided to the traffic passing through different networks. Some embodiments of the present disclosure adopt the following technical solution. Various service functions provided by the leased network present an inter-domain service function for a WAN, which is identified by an SFID in an SFC domain of the WAN.

A WAN controller/manager may apply for an SF service from a DC controller, and then a DC controller/manager may feed back an SFID to the WAN controller/manager. The WAN controller/manager may feed back the SFPID corresponding to the SFID of the DC. A DC controller/manager may establish an SFC path in the DC network aiming at the characteristic of the SFID, and map the internal SFC path and the SFPID of the WAN on a DC classifying device.

When the traffic enters the WAN, the classifier in the WAN may allocate an SFPID1 to the traffic according to the characteristic of the traffic (for example, 5-tuple of the traffic), and add the SFPID1 in the header of the message. The SF in the WAN may process and forward the message according to the SFPID1.

When the message is to be processed by using the service function in the DC network, the message may first be sent to a GW of the leased network, and then the GW may send the message to the classifier in the DC network, so as to classify the message. The classifier here may be separated from the GW or integrated physically. When classifying the message, the classifier may need to perform classification in the DC network in combination with the SFPID1 of the WAN carried in the message, generate the SFPID2 in the DC network according to the classification result, and add the SFPID2 in the header of the message again. The SFPID1 before the message may be encapsulated in the header of the SFPID2.

The SF in the DC network may process and forward the message according to the SFPID2, but may not sense and process for the SFPID1.

When the message is going to leave the leased network, the forwarding device SFF connected with the last service function processing the message may de-encapsulate the SFPID2 and forward it to the GW of the network. Then, the GW may send the SFPID2 to the inter-domain service function of the WAN or the next DC network, and the service function may perform subsequent processing to the message.

Moreover, when the message enters the DC network, the classifier of the DC network may perform mapping translation to the SFPID of the SFC header identifier of the original message, so as to translate the external SFPID into the internal SFPID. The internal message may be forwarded through the internal SFPID. When the message is going to leave the DC, the last SF device may translate and map the internal SFPID into the external SFPID.

Figure 1:
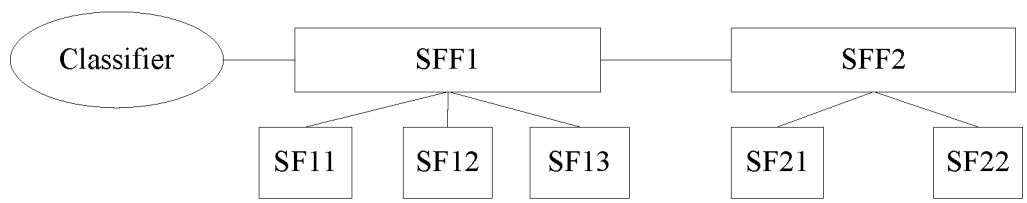
FIG. 1 is a schematic diagram of an existing forwarding mode of an SFC.
Figures 7, 8, 9:
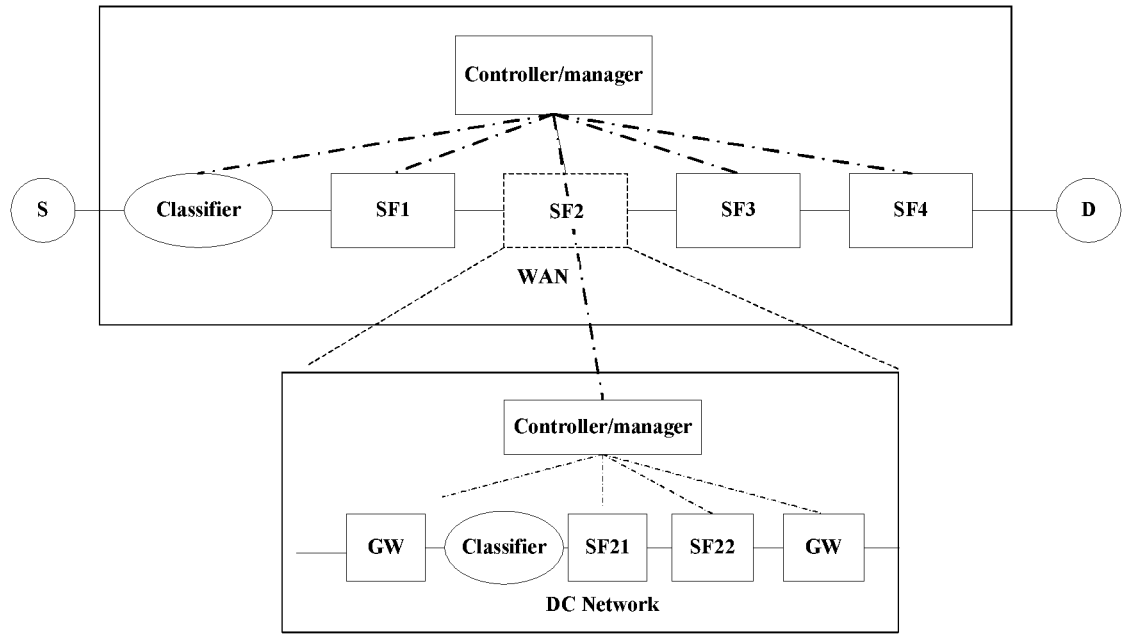
FIG. 7 is schematic diagram of sending traffic according to a first exemplary embodiment of the present disclosure.
FIG. 8 is a schematic diagram of a nested format of an SFC header according to a first exemplary embodiment of the present disclosure.
FIG. 9 is a schematic diagram of a format of an SFC header according to a second exemplary embodiment of the present disclosure.

First exemplary embodiment: the networking is shown in FIG. 1. A source device S may send traffic to a destination device D, and the traffic may need to pass through the SF1, SF2, SF3 and SF4. FIG. 7 is schematic diagram of sending traffic according to the first exemplary embodiment of the present disclosure. As shown in FIG. 7, each SF here may be an inter-domain SF. The inter-domain SF here may be an SFC in the DC network. For the WAN, the inter-domain SF may be an abstracted inter-domain SF. The DC network may provide only the abstracted SF to a top WAN, and the top network does not care about what kind of path the SFC in the DC network is.

When the top network needs to some specific service functions, it may be feasible to lease some service functions, such as DPI and computing, in the DC network, then the DC may provide only one SF2 with DPI and computing to a control plane of the WAN. For the WAN, the SF2 may be the same as other SF1, and there may be one SFID2 corresponding to the inter-domain service function SF2.

For the control plane of the WAN, the DC network may need to provide the SFID2 and the GW address as the next hop of the WAN SFC. The control plane of the WAN may need to inform the DC network about which SFCs may lease the service function in the DC, namely the SFPID1 of the WAN. The DC network may need to decide the correspondence between the SFPID1 and the SFC (SFPID2) in the network. It may be needed to reselect an SFC (corresponding to the SFPID2) in the DC according to the SFPID1 entering the DC network and 5-tuple information of the message.

FIG. 8 is a schematic diagram of a nested format of an SFC header according to the first exemplary embodiment of the present disclosure. As shown in FIG. 8, the message sent by the source device S may be classified in the classifier of the WAN, and the header of an SFC may be encapsulated for the message according to the classification result. On this SFC path, each SFF may perform forwarding according to the SFPID1. When the message is forwarded to the GW of the DC network, the GW may send the message of the classifier of the DC network according to a strategy, and then the classifier of the DC network may classify the message in the network. After receiving the message with the SFC header, the classifier may classify the message according to the SPDID1 of the SFC header and/or other header information of the message, and may obtain a sub-SFC path identifier SFPID2 of the DC network. Besides, the SFC header of the DC network may be added based on the original SFC header, as shown in FIG. 7. In the DC network, the message may be forwarded according to the SFPID2, and sent to different SFs to be processed.

After the processing in the DC network is completed, on the last SFF of the sub-SFC of the DC network, the SFPID2 of the outer DC network may be separated, and the original SFC header of the WAN may be kept and sent to the GW of the DC network. Then, the GW may send the SFC header to the next SF, namely the SF3, of the WAN for the next processing according to the message sent from the DC.

Each SF in the present embodiment may be an inter-domain SF of a DC, or an independent SF.

Second exemplary embodiment: the network scenario is still as shown in FIG. 1. The difference between the second exemplary embodiment and the first exemplary embodiment lies in that: the classifier in the DC may replace the SFPID1 of the original SFC header with the SFPID2, and save the SFPID2 in an outer TLV of the current SFC header, at the same time, set an identifier bit O2 of the SFC header. FIG. 9 is a schematic diagram of a format of an SFC header according to the second exemplary embodiment of the present disclosure. The format of the SFC header is as shown in FIG. 9. On the last SF before leaving the DC network, the SFF (namely Index=0) connected with the SF may process according to the identifier bit O2. If the identifier bit O2 is set, the SFF may revert the SFPID1 in the outer TLV to an SFPID field of the SFC header, and then forward it from the DC network.

Third exemplary embodiment: the network scenario is still as shown in FIG. 1. The traffic of the source device S may reach the destination device D after being processed by the SFC. The SFC may need to pass through a DC network, and lease some service function processing of the DC network.

The classifier in the DC network may need to obtain, through the control plane, a mapping relation between an external SFC and an internal SFC, namely the corresponding relation between the SFPID1 and the SFPID2.

After the message reaches the classifier of the WAN, the classifier may classify the message, encapsulate a header of the SFPID1 for the message, and forward the message to the SF1 for processing according to the SFPID1. After the processing of the SF1 is completed, it may be found that the next hop is the GW of the DC network.

After receiving the message entering from the outside of the network, the DC GW may first forward the message to the classifier of the DC network. The classifier may classify the message again according to the SFPID1 of the message and the header information of the message, and map the SFPID1 of the SFC header of the message to the SFPID2 according to mapping information obtained before. After entering the DC network, the message, carrying the SFC header of the SFPID2, may be forwarded in the DC. The SFPID2 may be mapped to the SFPID2 again on the forwarding device connected with the last SF of the SFC path, and the SFC header of the message may be reverted to the SFPID1 for the subsequent forwarding.

Fourth exemplary embodiment: as shown in FIG. 2, for the inter-domain SF2 provided by the DC network, if the traffic does not need to be processed by the inter-domain SF2 any more, the GW of the DC network may send a message notice to the WAN controller/manager, and the inter-domain SF2 provided by the DC network may offload from the SFC of the WAN. At the same time, the controller may establish a connection between the SF1 and the SF3.

Figures 10, 11:
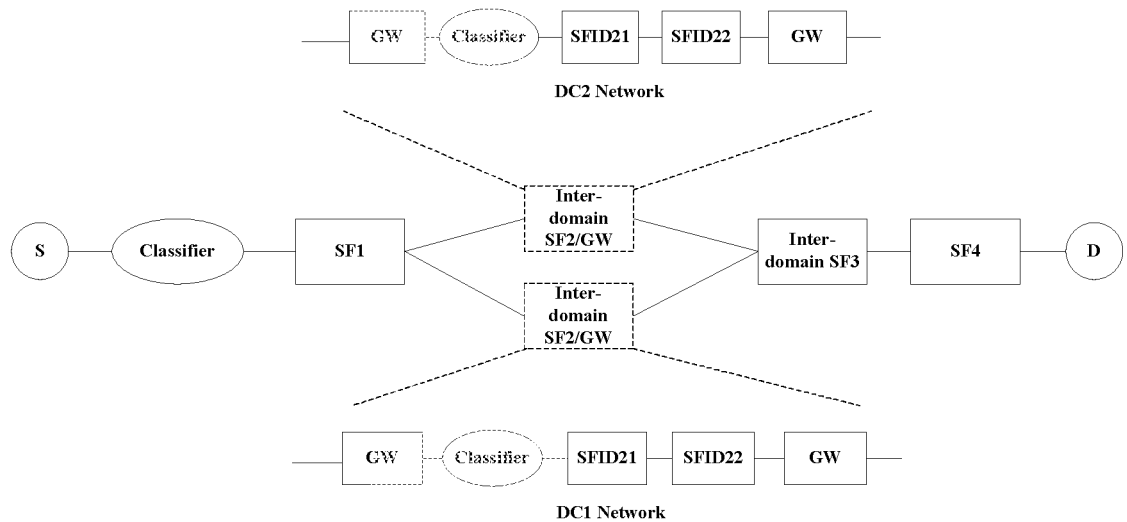
FIG. 10 is a schematic diagram of sending traffic according to a fifth exemplary embodiment of the present disclosure.
FIG. 11 is a schematic diagram of an SFC header according to a fifth exemplary embodiment of the present disclosure.

Fifth exemplary embodiment: FIG. 10 is a schematic diagram of sending traffic according to the fifth exemplary embodiment of the present disclosure. As shown in FIG. 10, the inter-domain SF2 and the inter-domain SF2' serve as backups of each other. The SF2 and the SF2' may register in the WAN and provide services at the same time. For the WAN, the SFC may first select the SF2 as an SF. The SF2' may serve as the backup SF. When the SF2 provided by the DC1 network cannot be used by the SFC of the WAN because of being withdrawn or other problems, the controller may inform the SFF of the SF1 of changing the next hop into the GW address of the SF2'. When the traffic enters the inter-domain SF2 from the SF1, the SF2' may encapsulate an SFPID2' for the message according to the SFPID of the SFC header of the traffic. The service functions of the SFPID2' and the inter-domain SF2' are in correspondence. At this point, the format of the SFC header of the traffic in the DC2 network is as shown in FIG. 11. The SFPID2 and the SFPID2' may be independent from each other. They may be either the same or different, but both of them are mapped from the SFPID1 as the forwarding identifiers for performing service function processing in the DC network.

Embodiment 6: the present embodiment mainly elaborates interaction between the DC GW and the WAN and mapping of interface. As shown in FIG. 1, when the DC leases an inter-domain SF (virtual and logical) to the WAN, the controller or management system of the DC network may need to interact with the controller or management system of the WAN, and provide the inter-domain SF to be leased to the controller or management system of the WAN as an SFID. At the same time, the address of the DC GW connected with the WAN may be provided to the controller or management system of the WAN as the next-hop address of the SFC of the WAN.

The controller or management system of the WAN may configure the inter-domain SF information (the SFID and the next-hop address) provided by the DC on the SFC of the WAN. At the same time, the controller or management system of the WAN may provide the SFPIDs of all the SFCs passing through the inter-domain SF to the controller or management system of the DC network.

Aiming at the inter-domain SF, the controller or management system of the DC network may configure, inside the network, an SFC corresponding to the inter-domain SF. The process mainly includes the following acts.

1. The controller may configure the DC GW. For example, for the received message, the controller may first send, according to the configured strategy, the message to be processed to the classifier for classification.

2. The controller may configure the classifier. For example, for the message carrying the SFC header, the controller may map an SFPID in a DC network according to the SFPID in the SFC header of the message, and then encapsulate an outer SFC header for the message. The outer SFC header may carry the SFPID in the DC network; or, the controller may replace the SFPID of the SFC header of the original message with the SFPID in the DC network.

3. The controller may configure the SFF and network device of the path through which the SFC passes, and may establish such a channel of the SFC.

For the first exemplary embodiment, at act 2 of the present embodiment, the controller may also configure the classifier. Except mapping the SFPID of the SFC header, it may also be needed to classify the header of the message to obtain the SFPID in the DC.

For the second exemplary embodiment, at act 3, the controller may also need to configure the SFF of the final hop and give the mapping information, may replace the SFPID, carried by the message, in the DC network with the SFPID of the WAN, and then may send the message to the GW, from which the message leaves the DC network.

To sum up, the embodiments of the present disclosure introduces a hierarchical SFC solution, which may enable an SFC to pass through multiple networks, and guarantee the privacy of an internal service chain of the DC network. The solution may have very important practical significance in a scenario of leasing other service functions in the WAN.

In another embodiment, software is provided, which may be used for performing the technical solutions described in the above embodiments and exemplary implementation modes.

In another embodiment, a storage medium is provided, in which the software is stored. The storage medium may include, but is not limited to: a compact disc, a floppy disk, a hard disk, an erasable memory, and so on.

Obviously, those skilled in the art should appreciate that the above modules and acts of the present disclosure may be implemented by a general-purpose computing device. The modules may be centralized in a single computing device or distributed on a network composed of multiple computing devices; optionally, they may be implemented by a program code which is capable of being executed by the computing device, so that they may be stored in a storage device and executed by the computing device. In some situations, the proposed or described acts may be executed in an order different from that described here; or they may be made into integrated circuit modules, respectively; or multiple modules and acts of them may be made into a single integrated circuit module to realize. In this way, the present disclosure is not limited to any particular combination of hardware and software.

The above is only the exemplary embodiment of the present disclosure and not intended to limit the present disclosure; for those skilled in the art, the present disclosure may have various modifications and changes. Any modifications, equivalent replacements, improvements and the like within the principle of the present disclosure shall fall within the scope of the claims of the present disclosure

INDUSTRIAL APPLICABILITY

As mentioned above, a method, device and system for message forwarding provided by some embodiments of the present disclosure have the following beneficial effects. An SFC may be enabled to pass through multiple networks, and the privacy of an internal service chain of a DC network may be guaranteed

What is claimed is:

1. A method for message forwarding, comprising:
   receiving, by a second device in a second domain, a first message from a first domain, wherein the first message carries a first SFPID allocated by the first domain for the first message;
   allocating, by the second device for the first message, a second Service Function Path Identifier (SFPID) corresponding to a Service Function Chain (SFC) in the second domain, and obtaining, by the second device, a second message; and
   sending, by the second device, the second message to one or more other devices, except the second device, in the second domain;
   wherein allocating, by the second device for the first message, the second SFPID corresponding to the SFC in the second domain, and obtaining, by the second device, the second message comprises:
   classifying, by the second device, the first message, and generating, by the second device, the second SFPID according to a classification result; and
   encapsulating, by the second device, the first message by adding the second SFPID outside the first message, so as to obtain the second message.

2. The method as claimed in claim 1, wherein receiving, by the second device in the second domain, the first message from the first domain comprises:
   receiving, by the second device, the first message through a Gateway (GW) device of the second domain.

3. The method as claimed in claim 2, wherein the first message is sent to the second domain by the first domain according to an address of the GW device of the second domain; the address of the GW device of the second domain is obtained by the first domain through a coordination management entity; and the address of the GW device of the second domain serves as an address of a Service Function (SF), corresponding to the SFC, of the first domain.

4. The method as claimed in claim 1, wherein the second device classifies the first message according to header information of the first message and/or the first SFPID, comprising:
   coordinating, by a coordination management entity, the first domain and the second domain; and obtaining, by a classifier of the second domain, a corresponding relation between the first SFPID and the second SFPID.

5. The method as claimed in claim 1, wherein after sending, by the second device, the second message to one or more other devices, except the second device, in the second domain, the method comprises:
   de-encapsulating, by a Service Function Forwarder (SFF) of a final hop of the second domain, the second message to remove the second SFPID, so as to obtain the first message; and
   sending, by the SFF, the first message to one or more other domains, except the second domain, via a GW device of the second domain.

6. The method as claimed in claim 5, wherein after sending, by the SFF, the first message to one or more other domains, except the second domain, via a GW device of the second domain, the method comprises:
   when the second domain no longer provides service function processing of the first message, sending, to the first domain by the GW device in the second domain, a notification message for deleting an SF provided by the second domain.

7. The method as claimed in claim 1, wherein allocating, by the second device for the first message, the second SFPID corresponding to the SFC in the second domain, and obtaining, by the second device, the second message comprises:
   classifying, by the second device, the first message, and obtaining a classification result;
   generating, by the second device, the second SFPID according to the classification result;
   replacing, by the second device, the first SFPID in a header of the first message with the second SFPID, and saving, by the second device, the first SFPID in metadata, so as to obtain the second message.

8. The method as claimed in claim 7, wherein after sending, by the second device, the second message to one or more other devices, except the second device, in the second domain, the method comprises:
   obtaining, by an SFF of a final hop of the second domain, the first SFPID from the metadata, and replacing, by the SFF, the second SFPID with the first SFPID, so as to obtain the first message; and
   sending, by the SFF, the first message to one or more other domains, except the second domain, via a GW device of the second domain.

9. The method as claimed in claim 1, wherein classifying, by the second device, the first message comprises:
   classifying, by the second device, the first message according to header information of the first message and/or the first SFPID.

10. The method as claimed in claim 1, wherein allocating, by the second device for the first message, the second SFPID corresponding to the SFC in the second domain, and obtaining, by the second device, the second message comprises:
    according to a corresponding relation between the first SFPID and the second SFPID, allocating, for the first message, the second SFPID corresponding to the first SFPID, and obtaining the second message.

11. The method as claimed in claim 10, wherein after sending, by the second device, the second message to one or more other devices, except the second device, in the second domain, the method comprises:
    mapping, by an SFF of a final hop of the second domain, the second SFPID to the first SFPID, and reverting the second message encapsulated with the second SFPID to the first message.

12. The method as claimed in claim 1, wherein the second domain comprises: a master domain and a backup domain.

13. The method as claimed in claim 1, wherein the second device is a classifier in the second domain.

14. A device for message forwarding, which is applied to a second device in a second domain, comprising:
    a receiving module, which is configured to receive a first message from a first domain, wherein the first message carries a first SFPID allocated by the first domain for the first message;

an allocating module, which is configured to allocate, for the first message, a second Service Function Path Identifier (SFPID) corresponding to a Service Function Chain (SFC) in the second domain, and obtain a second message; and a sending module, which is configured to send the second message to one or more other devices, except the second device, in the second domain;

wherein the allocating module further comprises:

a first classifying unit, which is configured to classify the first message, and obtain a classification result;

a first generating unit, which is configured to generate the second SFPID according to the classification result; and an encapsulating unit, which is configured to encapsulate the first message by adding the second SFPID outside the first message, so as to obtain the second message.

15. The device as claimed in claim 14, wherein the receiving module is further configured to send an address of a Gateway (GW) device of the second domain to the first domain, and receive the first message through the GW device of the second domain.

16. The device as claimed in claim 14, wherein the allocating module further comprises:

a second classifying unit, which is configured to classify the first message, and obtain a classification result;

a second generating unit, which is configured to generate the second SFPID according to the classification result; and a replacing unit, which is configured to replace the first SFPID in a header of the first message with the second SFPID, and save the first SFPID in metadata, so as to obtain the second message;

or, the allocating module further comprises:

an obtaining unit, which is configured to obtain a corresponding relation between the first SFPID and the second SFPID, allocate, for the first message, the second SFPID corresponding to the first SFPID, and obtain the second message.

17. A system for message forwarding, comprising: a first device in a first domain, and a second device in a second domain, wherein, the second device is configured to receive a first message sent by the first device, wherein the first message carries a first SFPID allocated by the first domain for the first message, allocate, for the first message, a second Service Function Path Identifier (SFPID) corresponding to a Service Function Chain (SFC) in the second domain, obtain a second message, and send the second message to one or more other devices, except the second device, in the second domain;

wherein the second device is further configured to classify the first message, and obtain a classification result, generate the second SFPID according to the classification result, and encapsulate the first message by adding the second SFPID outside the first message, so as to obtain the second message.

* * * * *